UNITED STATES PATENT OFFICE.

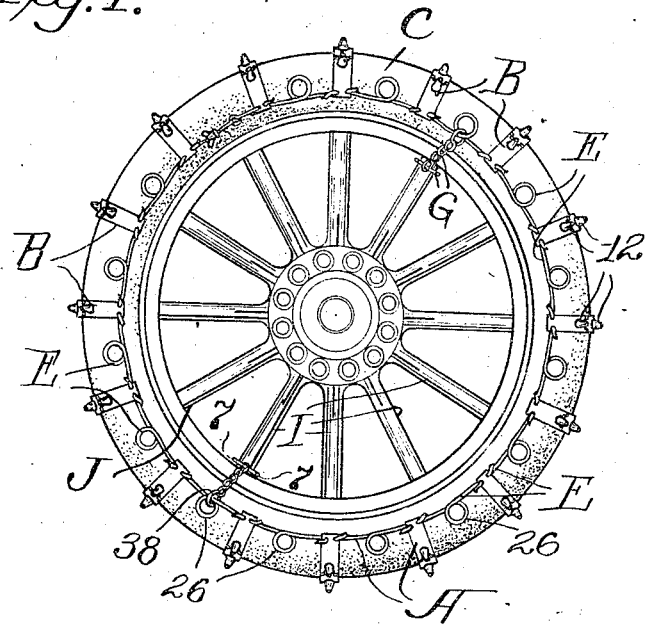
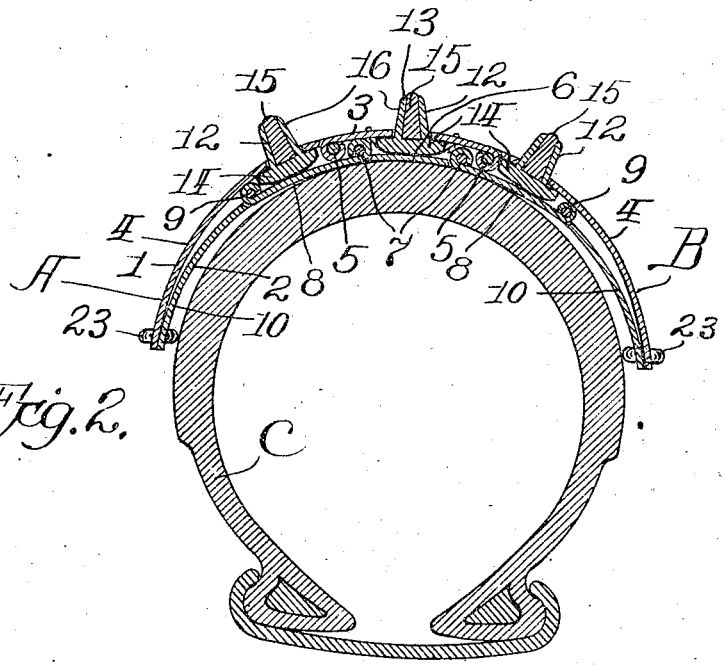

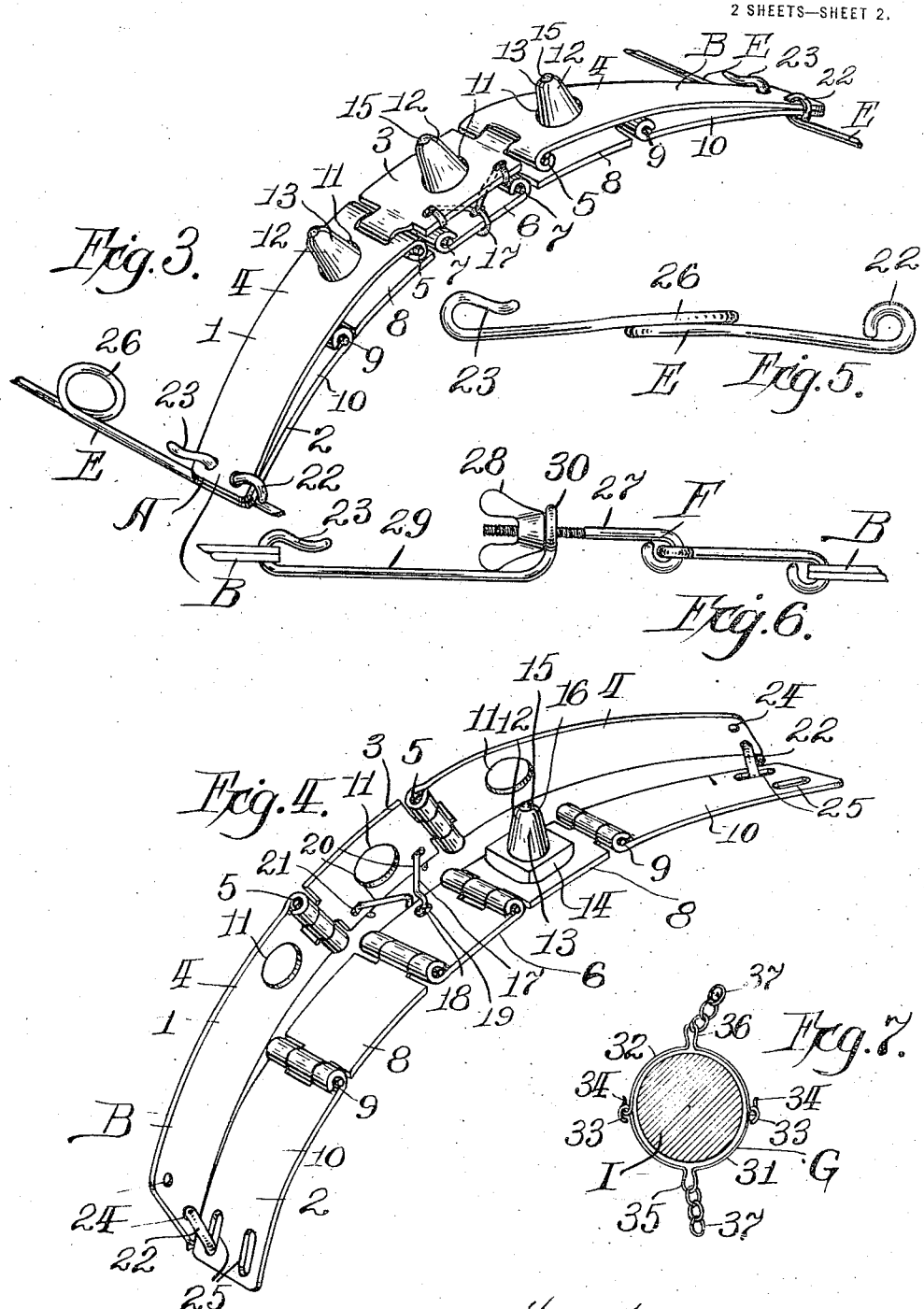

HARRY SUMMERFIELD, OF ST. PAUL, MINNESOTA.

ANTISKIDDING DEVICE.

1,278,058.  Specification of Letters Patent.  Patented Sept. 3, 1918.

Application filed June 27, 1917. Serial No. 177,381.

*To all whom it may concern:*

Be it known that I, HARRY SUMMERFIELD, a citizen of the United States, residing at St. Paul, in the county of Ramsey and State of Minnesota, have invented a new and useful Improvement in Antiskidding Devices, of which the following is a specification.

This invention relates to anti-skidding devices, the primary object of which is in providing means with removable studs or calks which are held between hinged plates across the curved or tread surface of an automobile tire.

It is also an object in providing thin plates, flat transversely and curved longitudinally, which lie flat against and curve about the surface of the tire to which they are secured, being hinged together so that they will give with the resiliency of the tire, thereby preventing buckling or damaging the surface of the tire.

A further object is in providing links between the stud holding plates which have a resilient loop so as to prevent sharp jerking on the stud holding plates when the anti-skidding device is in use and the studs are engaging the ground.

A further object is in interlocking the hinged portions of the plates so as to hold them flat and smooth across the tire surface and also form channels for the base of the removable studs.

These objects together with other features and combination of parts will be more clearly defined in the following specification and claims.

In the drawing forming part of this specification:

Figure 1 is a side elevation of an automobile wheel with the anti-skidding device attached thereto ready for use.

Fig. 2 is a cross section of a tire illustrating the anti-skidding device attached thereto in cross section.

Fig. 3 is a perspective view of one of the transverse hinged plates which extends across the surface of the tire and which carries the engaging studs therein.

Fig. 4 is a perspective view of the hinged plates which extend transversely across the tire, in open position.

Fig. 5 is a side elevation of a detail portion of the device.

Fig. 6 is a view of a detail of the clamping mechanism of the anti-skidding device.

Fig. 7 is a cross section of Fig. 1 taken on the line 7—7.

In the drawing, A represents an anti-skidding device which is made up of cross members B which are connected together by means of the links E. The links E also serve as spacers for the cross members B and are formed with a coil centrally between their ends so as to give them a certain amount of resiliency. The cross members B are made up of hinged bands 1 and 2 which are flat transversely and curved longitudinally so as to fit across the curved surface of a tire C as is illustrated in Fig. 1.

The bands 1 and 2 are made up of plates which are hinged together, the outer band 1 being formed with a central plate 3 and end plates 4, the end plates 4 being considerably longer than the central plate 3. The plates 3 and 4 are hinged together at 5. The lower band 2 is formed with a short central plate 6 which is hinged at 7 to the side plates 8 and the plates 8 are hinged at 9 to the end plates 10. The hinge portions 7 of the plate 6 interlock between the hinge portions 5 of the plates 3 and 4 and the curved portions of the hinges 5, 7 and 9 project between the two plates 1 and 2. This construction of hinged plates gives a member B with a smooth inner and outer surface, the smooth inner surface engaging over the surface of the tire. The band 2 lies directly under the band 1 and is of the same width and length as the band.

The plates 3 and 4 are formed with circular openings 11 through which calks or studs 12 project. The calks 12 are formed with an engaging end 13 and a base or head portion 14. The engaging end 13 of the calks 12 is formed conical and the head portion 14 is square, but it is obvious that the calks can be of any suitable shape. The base portion 14 of the calk is adapted to fit between the hinged portions 5, 7 and 9 so as to assist in holding the calks in place between the bands 1 and 2, as is illustrated in Fig. 2. The plates 6 and 8 of the lower band 2 are adapted to form bearing surfaces for the base or head 14 of the calks 12. Thus when pressure is exerted against the calks when in use, it will be transferred and distributed on to the plates of the band 2 and from the band 2 to the tread of the tire.

The calks or studs 12 are formed with a central portion 15 which is preferably of hard steel and is cast in the engaging end 13 of the calk 12 in the usual manner when the calks are made. The steel pin 15 of the calks 12 are harder than the encircling portion 16 so that the portion 16 will wear down faster than the central or pin portion 15, leaving a sharp engaging end on the end 13 of the studs or calks 12.

The plates 3 and 6 are linked together on one side by means of the link 17. The link 17 is formed with an eye 18 which engages in the opening 19 of the plate 6 and engaging ends or arms 20 which engage in the openings 21 formed in the plate 3, the link 17 pivotally holding the bands 1 and 2 together centrally so that the bands cannot spread and the calks 12 escape or fall out from between the bands. The calks are freely held between the bands 1 and 2, but they fit snug enough to prevent transverse movement in the same, the object of the link 17 being to hold the bands 1 and 2 together when the anti-skidding device is not in use.

The links E pivotally engage the end plates 4 and 10 on the same side as the link 17 by means of the eye 22 which is formed on one end of the links E, the eye 22 permanently pivoting or hinging the one side of the bands 1 and 2 together so that the bands can be opened as is illustrated in Fig. 4. The other side of the bands 1 and 2 are detachably held together on their ends by means of the hooks 23, the hooks 23 being formed on the opposite end to the eye of the links E, thus one side of the cross member E would be engaged on each end by the eye 22 of a pair of the links E and the other side would be engaged by hooks 23 which are formed on the adjacent or next pair of links E.

By this construction, the links E can be detachably secured on one side of the cross members B and the bands 1 and 2 opened as is illustrated in Fig. 4. When the bands are opened, new calks or studs can be inserted to take the place of the old ones.

The outer band 1 has its end plates 4 formed with round openings 24 while the inner band 2 has its end plates 10 formed with slotted openings 25. It is through these openings 24 and 25 that the eyes 22 and hooks 23 of the links E engage. The slots 25 in the bands 2 allow a free movement of the band 2 in relation to the band 1 when the same is held across the surface of a tire, as is illustrated in Fig. 1, or when laid out flat when the device A is not in use. It is also evident that the slots 25 will allow the bands 1 and 2 to slide longitudinally on their ends so as to conform with the resiliency of the tire C.

The hinged plates of the bands 1 and 2 also assist in allowing the cross members B to be sufficiently flexible in use to operate successfully. The hinged plates allow the bands or portions B to freely give with the tire. Even if the tire should become flat the cross members B would not cramp or cut the surface of the tire. It will be noted that the cross members B do not extend completely around transversely of the surface of the tire C and that only the outer or tread surface is covered by the transverse members B. This assists in the operation of the device A especially if the tire should become soft.

The links E are formed with a central coiled portion 26 which can be of one or more coils according to the resiliency desired in the links E. The coiled portions 26 of the links E are adapted to give sufficient resiliency to the links and the anti-skidding device when in use so as to prevent sharp jerking or severe strain on the engaging studs or calks 12. The links E together with the ends of the cross members B form a complete holding ring on each side of the tire C and are adapted to hold the cross members spaced apart around the surface of the tire C.

A connecting link F is formed with a threaded bolt portion 27 on which the wing nut 28 is threaded and the bolt 27 is adapted to engage the link 29 through the eye 30 so as to secure the anti-skidding device A snugly about the surface of the tire C, the tension on the links E being increased by means of the wing nut 28. The connecting link or means F can be of any suitable construction and one of these connecting links is adapted to be positioned between the cross members B on both sides of the tire so that the holding ring formed by the links E and the ends of the cross members B can be drawn up evenly on both sides of the tire. The flexibility of the bands B and the resiliency of the tire C allow the central calk or stud 12 to depress sufficiently so that the calks on both sides of the central calk will also engage the surface over which the tire is traveling when the wheel is in motion, the center calk again assuming normal position when it disengages the ground. Thus all of the calks 12 will engage simultaneously on each member B as they come in position to contact with the ground in the rotation of the wheel.

The anti-skidding device A is adapted to be held against movement about the circumference of the tire C by means of the anchoring elements G which are formed of semicircular connecting links 31 and 32, the links 31 having eyes 33 in which hooks 34 are adapted to engage and which are formed on the end of the portion 32. The links 31 and 32 of the anchoring device G are adapted to encircle the spoke I of the wheel J. The links 31 and 32 are formed with loops 35 and 36 in which chains 37 are linked, the chains 37 being adapted to engage one of the coils 26 of the links E by means of a ring or other suitable fastening device 38 which is secured to the ends of the chains 37. The rings 38 engage the links on both sides of the tire C. As is illustrated in the drawing in Fig. 1, two of the anchoring devices G are used but it is obvious that more can be used if it is desired.

The engaging or cross members B can be of any suitable form or shape but it is preferred to make them of plates hinged together. It is also evident that the members B can be made of suitable hinged plates to conform with the shape of various shaped tires, such as hard tires, etc. It is also evident that a larger or smaller number of plates can be used to make up the bands 1 and 2. It is important to have a smooth bearing surface which lies against the tread surface of the tire so as to reduce the wear on the same. The interlocking hinged plates of the bands 1 and 2 give a free and flexible portion B which operates freely with the tire.

I have illustrated one particular form and construction in the accompanying drawing but I desire to have it understood that this is only illustrative and that the invention can be carried out by other means and applied to uses other than those above set forth within the scope of the following claims:

1. In an anti-skidding device comprising, a series of transverse tread engaging elements being formed of plates hinged together to form outer and inner flexible bands, calks freely and detachably held between said bands and means for holding said transverse tread elements spaced apart about the tread of a tire.

2. In an anti-skidding device having a plurality of flexible bands, said bands comprising outer and inner portions formed of a series of thin plates hinged together, engaging studs held between said outer and inner series of hinged plates and having their engaging ends projecting through the outer series of plates, the inner series of plates forming a bearing surface for the head of said studs whereby when said anti-skidding device is in use, pressure on said engaging studs will be evenly transferred and distributed to the surface of said inner series of hinged plates, substantially as described.

3. In a device of the class described, comprising a plurality of transverse bands connected together and spaced apart by a series of links, said transverse bands comprising a series of outer and inner transversely hinged plates, one side of said bands being hinged longitudinally together by one end of a pair of said links and other side of said bands being detachably held by the other end of the next adjacent pair of links and removable studs held by said bands so that their engaging ends will project through one of said bands, substantially as described.

4. In a device of the class described having a series of transverse members, said transverse members comprising, outer and inner bands formed by hinging a series of thin plates together, a series of calks held between said bands and having their engaging ends projecting through said outer band of said transverse member and their inner or head portion engaging against said inner band, a series of links having an engaging eye formed on one end for engaging the ends of said outer and inner bands to hold them hinged together and said links being formed with a hook on the other end so as to detachably engage the next band on the other side of the same, whereby said bands can be disengaged on one side from said hooks and pivoted on the eyes of said links to open said bands to replace the worn down calks with new ones, substantially as described.

5. In a device of the class described, having a plurality of transverse members, said members being formed with inner and outer bands, said outer and inner bands being made up of a series of thin plates hinged together, a series of engaging calks removably held between said bands, spacing links for hinging the ends of said bands together on one side and detachably engaging the other side of the ends of said bands so that said bands can be opened to remove said calks and a link for connecting or hinging the center of said bands together so as to prevent the spreading or separating of the same, substantially as described.

HARRY SUMMERFIELD.